No. 818,601. PATENTED APR. 24, 1906.
E. V. BEALS.
AREAMETER.
APPLICATION FILED AUG. 20, 1903.
3 SHEETS—SHEET 1.
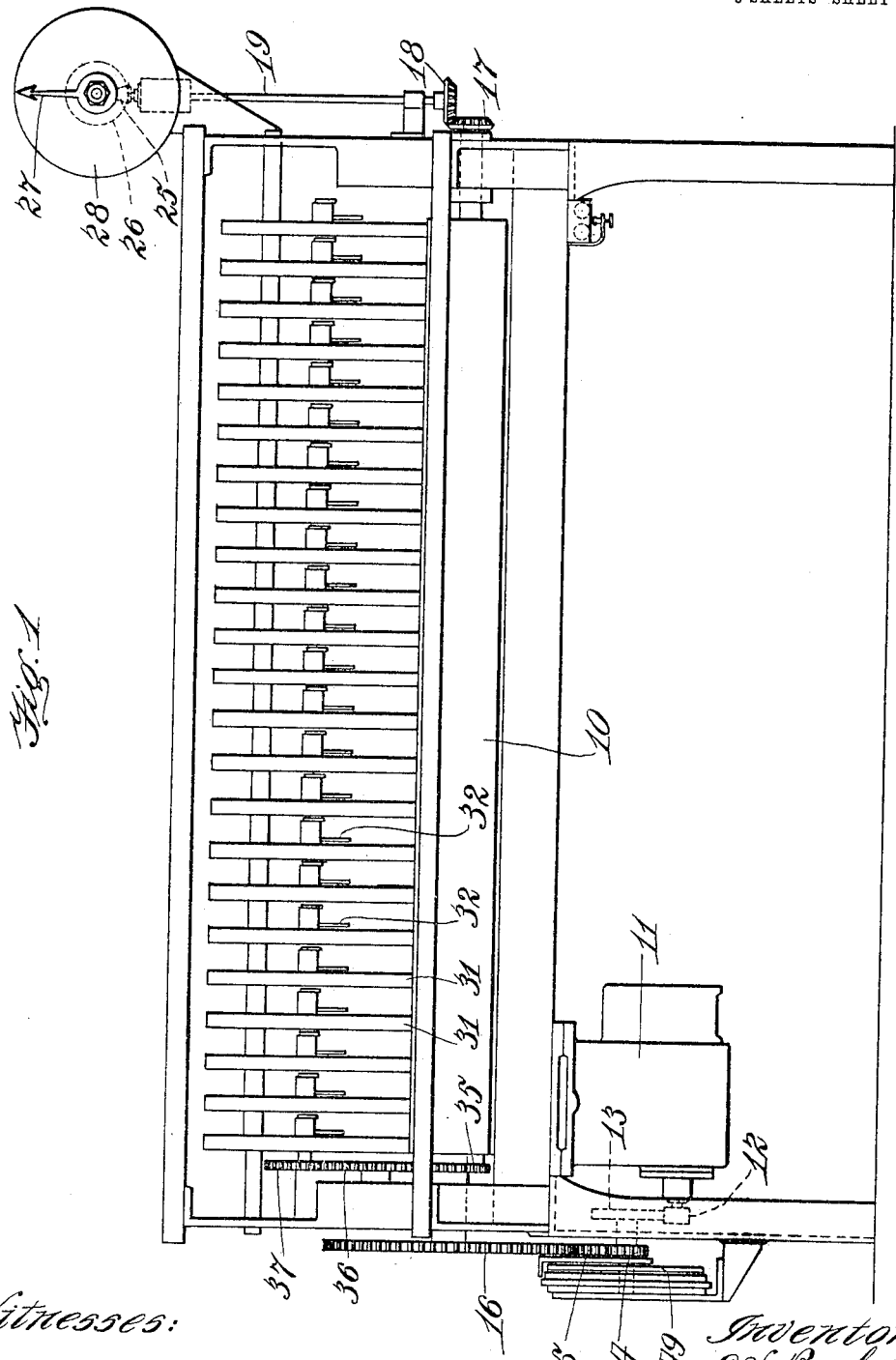
Witnesses:
L. E. Kennedy
E. Batchelder
Inventor:
E. V. Beals.
by Wright Brown Quinby
attys No. 818,601. PATENTED APR. 24, 1906.
E. V. BEALS.
AREAMETER.
APPLICATION FILED AUG. 20, 1903.
3 SHEETS—SHEET 2.
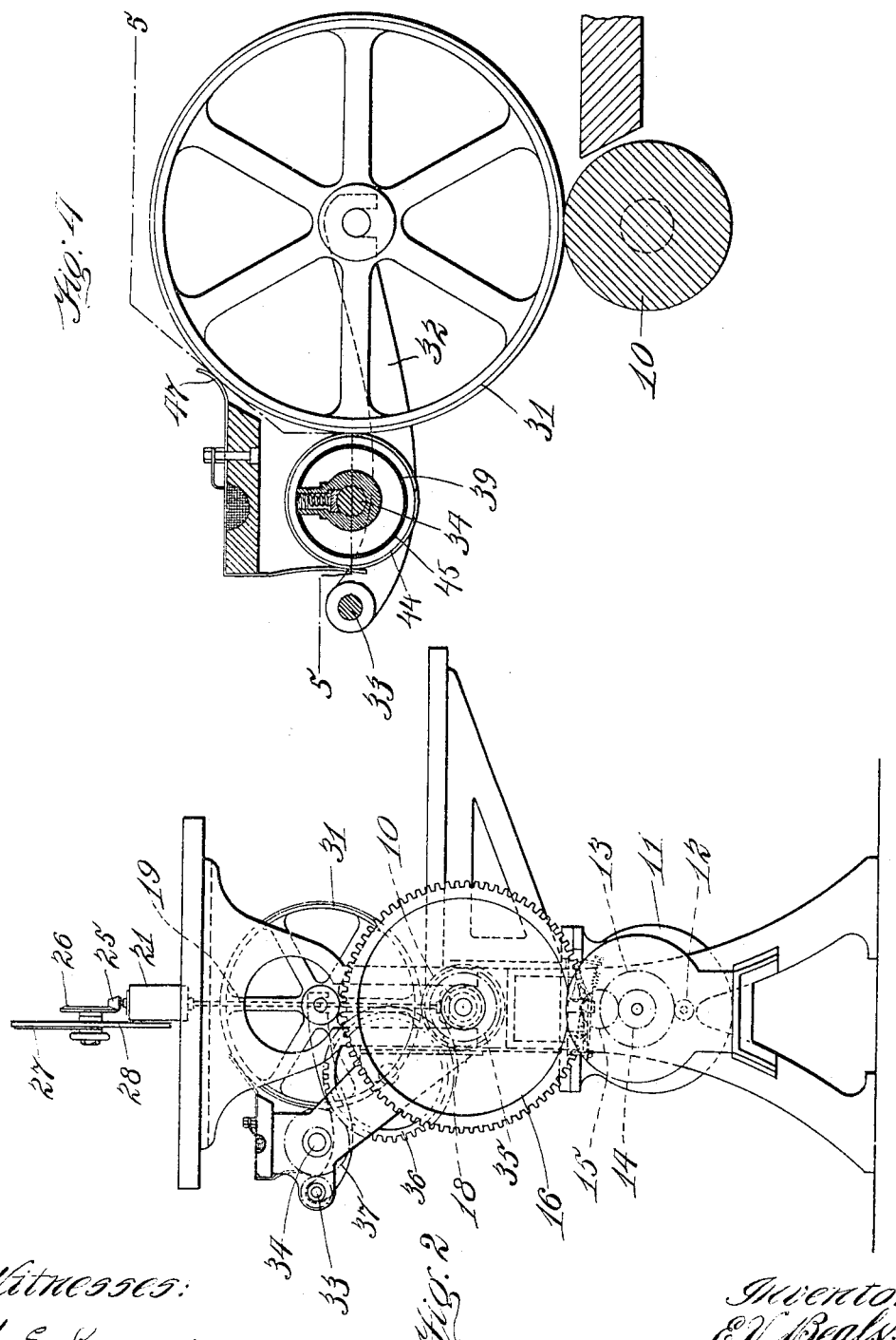

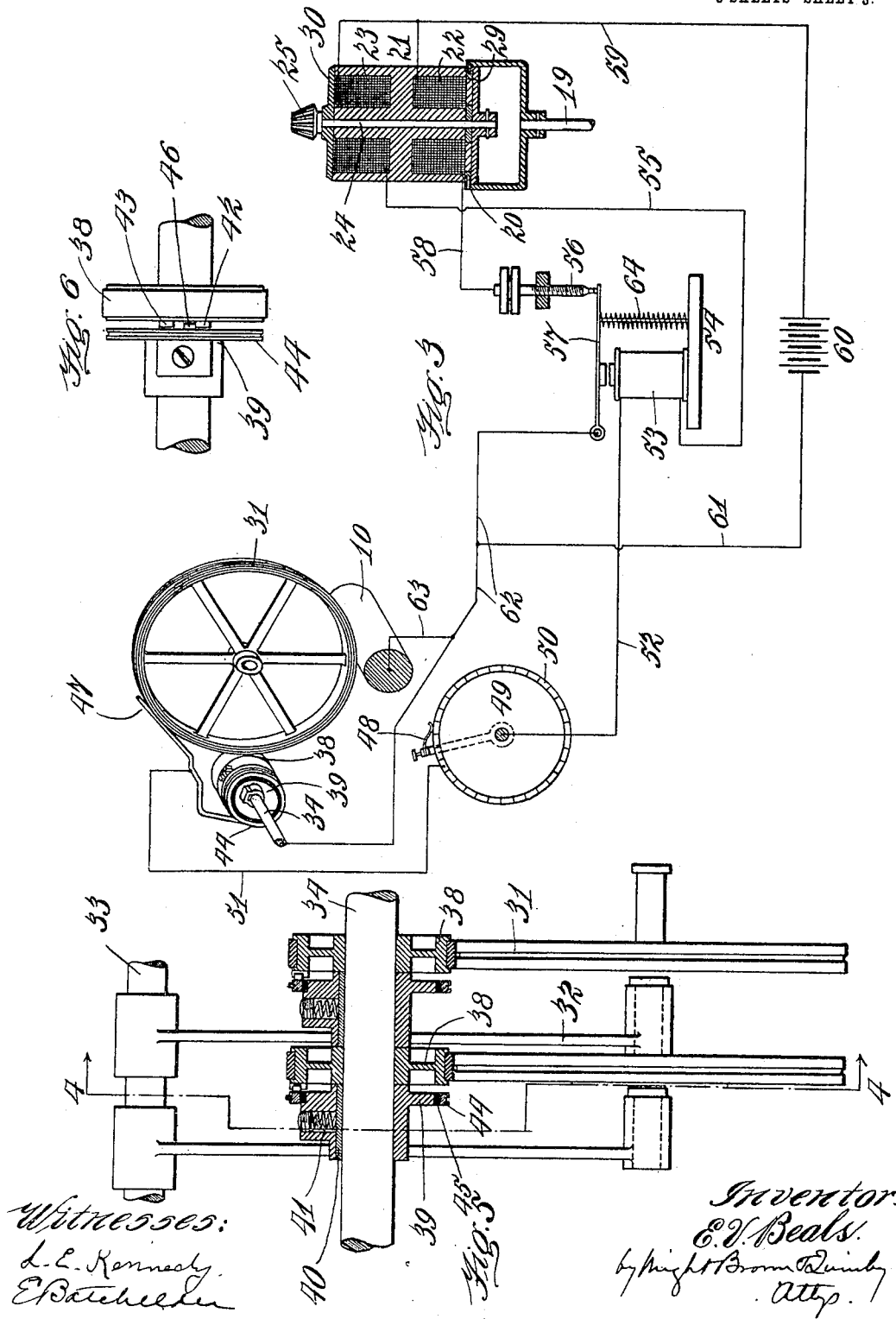

UNITED STATES PATENT OFFICE.

ERL V. BEALS, OF BOSTON, MASSACHUSETTS.

AREAMETER.

No. 818,601.  Specification of Letters Patent.  Patented April 24, 1906.

Application filed August 20, 1903. Serial No. 170,152.

*To all whom it may concern:*

Be it known that I, ERL V. BEALS, a resident of Boston, in the county of Suffolk and State of Massachusetts, have invented certain new and useful Improvements in Areameters, of which the following is a specification.

This invention relates to apparatus for measuring the area of leather or other web, and has particular reference to machines of the class described in United States Letters Patent No. 674,953, granted to me May 28, 1901.

Briefly stated, the machine therein shown comprises a web-propelling measuring-roll of definite circumference, positively geared to the driving member of an electromagnetic clutch of which the driven member is geared to a hand or pointer of an indicator. Distributed at intervals along the propelling-roll corresponding to definite units of breadth are a series of contacts adapted to be separated by the insertion of the web and belonging to circuits, all of which control the indicator-clutch and are themselves controlled by a commutator-selector having a constantly-rotating brush geared to the measuring-roll and acting to feel or test the several width-measuring circuits in succession. Should any circuit be broken by the web when the selector-brush is on the commutator-segment corresponding to that circuit, the pointer-operating member of the clutch will become engaged with the constantly-driven member and the pointer will indicate a certain number of square inches denoting the product of the length of web passed by the driving-roll while the brush is on that segment and the distance between two adjacent sets of width-measuring contacts.

One defect of the machine described in the aforesaid patent is that if the web should be held back in order to draw out a wrinkle caused by irregular feeding the indicator will still register the retarded part as through said part were properly feeding through the machine, this being due to the fact that whenever any of the contacts are separated by the web the indicator will register whenever the corresponding circuits are reached by the selector-brush.

The present invention has for its object to overcome this difficulty and disable the circuits or connections corresponding to those portions of the web which are held back by the operator in feeding the web to the machine.

The invention consists in the novel features of construction and arrangement which I shall now proceed to describe and claim.

Of the accompanying drawings, Figure 1 represents a front elevation of an areameter constructed according to this invention. Fig. 2 represents an end elevation thereof. Fig. 3 represents a diagrammatic view of the circuits. Fig. 4 represents a transverse vertical section through the measuring-roll and contact devices. Fig. 5 represents a section on line 5 5 of Fig. 4. Fig. 6 represents a plan view of the circuit-disabling wheels.

The same reference characters indicate the same parts in all the figures.

In the drawings, 10 is a web-propelling measuring-roll of definite circumference, one foot, for instance, continuously propelled by a motor 11 through gearing 12 13 14 15 16 and connected by gearing 17 18 and shaft 19 with the driving-disk 20 of an electromagnetic clutch device 21. This device is a double magnet, having a motor-winding 22 at its lower end and a checking or braking winding 23 at its upper end. A stem 24, connected by gearing 25 26 with the hand or pointer 27 of an indicator having a dial 28, carries at its lower end a disk 29, constituting the driven clutch member and the armature of the motor-magnet, and a second disk 30 at its upper end, constituting the armature of the checking-magnet. When the current in the motor-winding 22 prevails, the indicator-hand is clutched to the web-propelling roll 10 and when the current in the checking-winding 23 prevails the hand is arrested or checked.

31 31 are a series of loosely-rotating contact-wheels guided by pivotal arms 32, loose on a rod 33 and capable of independent separation from the roll 10, which has a metallic surface constituting a common contact for the wheels 31.

34 is a shaft connected to rotate with the web-propelling roll 10 through gears 35 36 37, and on said shaft behind each of the wheels 31 is a rubber-shod wheel 38, propelled by the wheel 31, and a wheel 39, having a frictional engagement with the shaft 34 through a block 40 and spring 41. The metal body of the wheel 38 in electrical contact with the shaft 34 carries an insulating-stop 42 and a metallic contact-stop 43, separated therefrom by a small space. The metallic rim 44 of wheel 39, which is separated from the hub of said wheel by a ring of insulation 45, carries a metallic contact-pin 46, which plays between the stops 42 43. In contact with the periphery of wheel 31 is one end of a double brush 47, whose other end is in contact with the rim of wheel 39.

Geared with the web-propelling roll 10 is the revolving brush 48 of a selective device 49, whose other member is a stationary commutator 50, having segments connected by wires 51 with the several brushes 47, there being as many commutator-segments as there are width-measuring units of wheels 31 38 39. The brush 48 is connected by a wire 52 to the magnet 53 of a relay 54, and the opposite terminal of said magnet is connected by the wire 55 with one terminal of the check-winding 23.

56 is a contact controlled by the armature 57 of the relay and connected by the wire 58 with one terminal of the motor-winding 22 of the clutch. The opposite ends of the windings 22 23 are connected, through wire 59, with one side of a battery 60, (or other source of current,) and the opposite side of said battery is connected by wires 61 62 63, respectively, with the relay-armature 57, the web-propelling roll 10, and the shaft 34.

In normal operation when no web is present between the propelling-roll 10 and the contact-wheels 31 the current passes as follows: through wire 59, check-winding 23, wire 55, relay-magnet 53, wire 52, selector-brush 48, and momentarily through the several commutator-segments in succession and corresponding wires 51 to brushes 47. From the brush 47 the current continues through wheel 31, roll 10, and wires 63 62 61 to the left-hand side of battery 60. As the brush 48 bridges adjacent segments of the commutator 50, there is a continuous current through the relay-magnet 53 and check-winding 23 so long as no web is present. The indicator-hand is therefore held stationary, and the motor end of the clutch device 21 remains inoperative. The effect of the selector 49, as more fully described in my aforesaid patent, is to successively feel or test the whole series of branch circuits along the propelling-roll 10 while said roll makes a predetermined circumferential advance. If any of said circuits is broken by the presence of the web, the indicator is actuated for a record corresponding to that amount of advance and the distance between adjacent wheels 31, and such actuation takes place as follows: When any branch circuit is broken between the corresponding wheel 31 and roll 10, when the selector-brush 48 reaches the corresponding commutator-segment the circuit through relay-magnet 53 and check-winding 23 will be broken. This releases the armature 57, and the latter connects with the contact 56 by the force of a spring 64, thus immediately completing a circuit through the motor-winding 22 of the clutch device by way of the battery 60, wire 59, motor-winding 22, wire 58, contact 56, armature 57, and wires 62 61 The armature and clutch member 29 will be attracted to the clutch member 20 and the pointer 27 driven ahead a certain distance.

The above normal action of the machine when the web is present requires that the web should not be retarded. When such normal condition obtains, the angular speed of each of the rubber-shod wheels 38, driven by the wheels 31, is slightly greater than that of the shaft 34, and the insulating-stop 42 of wheel 38 advances against the contact-pin 46 of wheel 39, and the latter is driven at a slightly greater speed than its shaft. Should the web be stopped, so that the propelling-roll 10 slips under it, the web-propelled wheel 31 will also stop and cause the wheel 38 to stop. The friction-block 40 in wheel 39 carries the latter ahead until pin 46 engages contact 43, and wheel 39 is then also arrested, and this action immediately completes the circuit through the relay-magnet 53 and check-winding 23 by way of the brush 47, wheel-tread 44, pin 46, contact 43, wheel 38, shaft 34, and wire 62. The armature 57 is therefore attracted and the circuit broken through the motor end of the clutch device. The circuit which was operative to energize the clutch and propel the indicator is therefore disabled by the retarding of the web, and all of the circuits thus affected will remain inoperative until the web is released.

I believe it to be broadly new with me to disable the connection between the measuring device and the indicator by means actuated through the holding of the web, and I therefore do not confine myself to the exact device shown, but claim all equivalent means for effecting this disablement whether partial or total.

The conductive roll 10 and contact-wheels 31 form effective circuit-controlling devices which are an improvement over the devices shown in my aforesaid patent, and a further improvement consists in the employment of the relay 54, whereby the circuit of the motor end of the clutch device is made simultaneously with the breaking of the circuit at the check end, thus securing a remarkably quick action of the clutch device.

I claim—

1. In an areameter, continuously-operative web-propelling means, area-measuring means, and web-actuated means operated by relative slipping of the web and its propelling means for disabling said area-measuring means.

2. In an areameter, a web-controlled measuring-circuit, an indicator controlled thereby, and web-actuated means for rendering said circuit inoperative with respect to the indicator.

3. In an areameter, an indicator, a series of web-controlled selective devices, means made operative by the presence of the web for operatively connecting said devices with the indicator, and web-actuated means for disabling the connection when the web is retarded.

4. In an areameter, web-propelling length-measuring means, an indicator, a clutch to connect said indicator with said measuring means, a series of breadth-measuring selective devices controlling the clutch, and web-controlled means to disable said devices.

5. In an areameter, a series of breadth-measuring web-controlled selective circuits, indicating means controlled thereby, and web-controlled means for disabling said circuits.

6. In an areameter, a web-propelled friction-wheel, a contact driven thereby, a coöperating contact normally carried with said driven contact, and a constantly-moving frictional device to pick up said coöperating contact and change the relation of the contacts when the friction-wheel is held.

7. In an areameter, constantly-moving web-propelling means, web-propelled elements, an indicator, controlling connections between said elements and the indicator, and means made operative by the retarding of said elements for disabling said connections.

8. In an areameter, an indicator, web-propelled devices connected therewith, constantly-operative web-propelling means, and mechanism operated by a change in speed relation between said devices and the web-propelling means for disabling the connections to the indicator.

9. In an areameter, constantly-operative web-propelling means, a series of measuring-circuits, a series of web-propelled elements, and means operated by a change in speed relation between said means and elements for disabling said circuits.

10. In an areameter, a web-driven contact, a coöperating contact, a constantly-moving driver for the latter, and a frictional slipping connection between said driver and coöperating contact.

11. In an areameter, a wheel mounted for engagement and rotation by the web, a constantly-rotated shaft, a contact-wheel loose on said shaft and rotated by the web-engaged wheel, and a coöperating contact-wheel mounted on and having a frictional connection with said shaft.

12. In an areameter, an indicator, a web-engaging element, a constantly-moving driver, a frictional slipping device associated with said element, and a connection between said element and the indicator disabled by the action of said device.

13. In an areameter, a conductive web-propelling measuring-roll, a series of independently-movable conductive wheels coöperating therewith, an indicator, indicator-operating means, and a series of circuits including said roll and the respective wheels and controlling the connection of said indicator with its operating means.

14. In an areameter, an indicator, an electromagnetic clutch device controlling the same and having a motor-circuit and a checking-circuit, a relay controlling one of said circuits and having its magnet included with the other circuit, and a series of web-controlled contacts controlling said relay and clutch device.

In testimony whereof I have affixed my signature in presence of two witnesses.

ERL V. BEALS.

Witnesses:
R. M. PIERSON,
E. BATCHELDER.